US011593558B2

(12) United States Patent
Xin et al.

(10) Patent No.: US 11,593,558 B2
(45) Date of Patent: Feb. 28, 2023

(54) DEEP HYBRID NEURAL NETWORK FOR NAMED ENTITY RECOGNITION

(71) Applicant: eBay Inc., San Jose, CA (US)

(72) Inventors: Yingwei Xin, San Jose, CA (US); Jean-David Ruvini, Campbell, CA (US); Ethan J. Hart, Portland, OR (US)

(73) Assignee: eBay Inc., San Jose, CA (US)

( * ) Notice: Subject to any disclaimer, the term of this patent is extended or adjusted under 35 U.S.C. 154(b) by 280 days.

(21) Appl. No.: 15/692,392

(22) Filed: Aug. 31, 2017

(65) Prior Publication Data

US 2019/0065460 A1 Feb. 28, 2019

(51) Int. Cl.
| | |
|---|---|
| *G06F 40/295* | (2020.01) |
| *G06N 3/04* | (2006.01) |
| *G06N 3/08* | (2006.01) |
| *G06N 7/00* | (2006.01) |
| *G06N 3/082* | (2023.01) |
| *G06F 40/30* | (2020.01) |
| *G06F 40/47* | (2020.01) |

(52) U.S. Cl.
CPC ......... *G06F 40/295* (2020.01); *G06N 3/0445* (2013.01); *G06N 3/0454* (2013.01); *G06N 3/08* (2013.01); *G06N 3/082* (2013.01); *G06N 7/005* (2013.01); *G06F 40/30* (2020.01); *G06F 40/47* (2020.01); *G06N 3/0481* (2013.01)

(58) Field of Classification Search
None
See application file for complete search history.

(56) References Cited

U.S. PATENT DOCUMENTS

| | | | |
|---|---|---|---|
| 9,280,535 B2* | 3/2016 | Varma | G06F 16/243 |
| 2016/0350655 A1 | 12/2016 | Weiss et al. | |
| 2017/0337202 A1* | 11/2017 | Arya | H04L 67/535 |

FOREIGN PATENT DOCUMENTS

CN     106569998 A   *   4/2017

OTHER PUBLICATIONS

Joseph D, Prusa and iaghi M. Khoshgoftaa, Improving deep neural network design with new data representation, Mar. 28, 2017, pp. AIIURL https://rd.springer.com/article/10.1186/s40537-017-0065-8 (Year: 2017).*

(Continued)

*Primary Examiner* — Richa Mishra
(74) *Attorney, Agent, or Firm* — Holland & Hart LLP (57) ABSTRACT

In an example, a text sentence comprising a plurality of words is obtained. Each of the plurality of words is passed through a deep compositional character-to-word model to encode character-level information of each of the plurality of words into a character-to-word expression. The character-to-word expressions are combined with pre-trained word embeddings. The combined character-to-word expressions and pre-trained word embeddings are fed into one or more bidirectional long short-term memories to learn contextual information for each of the plurality of words. Then, sequential conditional random fields are applied to the contextual information for each of the plurality of words.

18 Claims, 9 Drawing Sheets

(56) References Cited

OTHER PUBLICATIONS

Joseph D,Prusaandiaghi M.Khoshgoftaa, Improving deep neural network design with new data representation, 2 8 March 2 017, Pages: AllURLhttpos://rd.springer.com/article/10.1186/s40537-017-0065-8 (Year: 2 017).*

U.S. Appl. No. 62/398,386, filed Sep. 2016.*

Joseph D, Prusa and iaghi M. Khoshgoftaa, Improving deep neural network design with new data representation, Mar. 28, 2017, pp. AIIURL https://rd.springer.com/article/10.1186/s40537-017-0065-8 (Year: 2017).*

Alexis Conneau,Holger Schwenk;Yann Le Cun; Very Deep Convolutional Networks for Text Classification; Jan. 2017; pp. All URL: https://arxiv.org/pdf/1606.01781.pdf (Year: 2017).*

Luong et al., "Better Word Representations with Recursive Neural Networks for Morphology", Aug. 2013, 10 pages.

Prusa et al., "Improving Deep Neural Network Design with New Text Data Representations", Journal of Big Data, Mar. 28, 2017, 16 pages.

Seker et al., "Initial Explorations on using CRFs for Turkish Named Entity Recognition", Dec. 2012, pp. 2459-2474.

Yuan, "Named-Entity Recognition using Deep Learning", Retrieved from the Internet: URL <http://eric-yuan.me/ner_1/>, Mar. 23, 2015, 7 pages.

Anonymous EMNLP Submission, "Deep Compositional Neural Character Representation for Multilingual Named Entity Recognition", EMNLP 2017 Submission, 2017, 10 pages.

\* cited by examiner

| EXAMPLE | | | | | |
|---|---|---|---|---|---|
| MICHAEL | KORS | MEDIUM | BROWN | LEATHER | HANDBAG |
| ⇒ | ⇒ | ⇒ | ⇒ | ⇒ | ⇒ |
| BRAND | | SIZE | COLOR | MATERIAL | TYPE |
| → | → | → | → | → | → |
| B-BRAND | E-BRAND | S-SIZE | S-COLOR | S-MATERIAL | S-TYPE |

DEEP HYBRID NEURAL NETWORK FOR NAMED ENTITY RECOGNITION

TECHNICAL FIELD

Embodiments of the present disclosure relate generally to machine learning and more particularly, but not by way of limitation, to a deep hybrid neural network for named entity recognition.

BACKGROUND

Named entity recognition (NER) is a fundamental problem in Natural Language Processing (NLP). It generally is one of the first stages in a machine-learning algorithm's attempt to understand tasks in a language. NER comprises classifying a chunk of text into several predefined categories of interest, such as person, organization, location, and time. NER is a challenging learning problem because in many domains and languages there is only a very small amount of supervised training data available in order to train a machine-learning model. As a result, carefully constructed hand-crafted orthographic and domain-specific knowledge (e.g., gazetteers) are widely used for solving this task. Unfortunately, hand-crafted features and language-specific resources are difficult to develop and do not scale well. As such, NER is challenging to adapt to new languages and new domains.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a hybrid deep neural network architecture is provided for NER that uses no language-specific resources (such as gazetteers), no hand-crafted features, and no case normalization. A deep compositional character-to-word (DCC2 W) model is used to learn from a limited, supervised training corpus for each word. As such, a more sophisticated deep convolutional architecture may be used for constructing vector representations of words by composing characters.

First, the DCC2 W model is used to encode character-level information of a word into its character-to-word expression. Then the DCC2 W representations are combined with pre-trained word embeddings, and these are then fed into bidirectional Long Short-Term Memories (LSTMs) to learn contextual information for each word. LSTMs will be described in more detail below. Finally, sequential conditional random fields (CRFs) are applied on top of bidirectional LSTMs to jointly decode labels for an entire sentence.

Thus, the model relies on two sources of information about words: DCC2 W representations learned from the supervised corpus, and unsupervised word representations learned from unannotated corpora that can capture both orthographic and context information. This reduces or eliminates the need for feature engineering and allows for end-to-end learning from scratch.

Furthermore, the training process of the DCC2 W is performed without fine tuning pre-trained word embeddings, and only compositional character-to-word representations are learned. This gives the DCC2 W model more freedom to learn better morphological representations. In some example embodiments, the pre-trained word embeddings are tuned.

Figure 1:
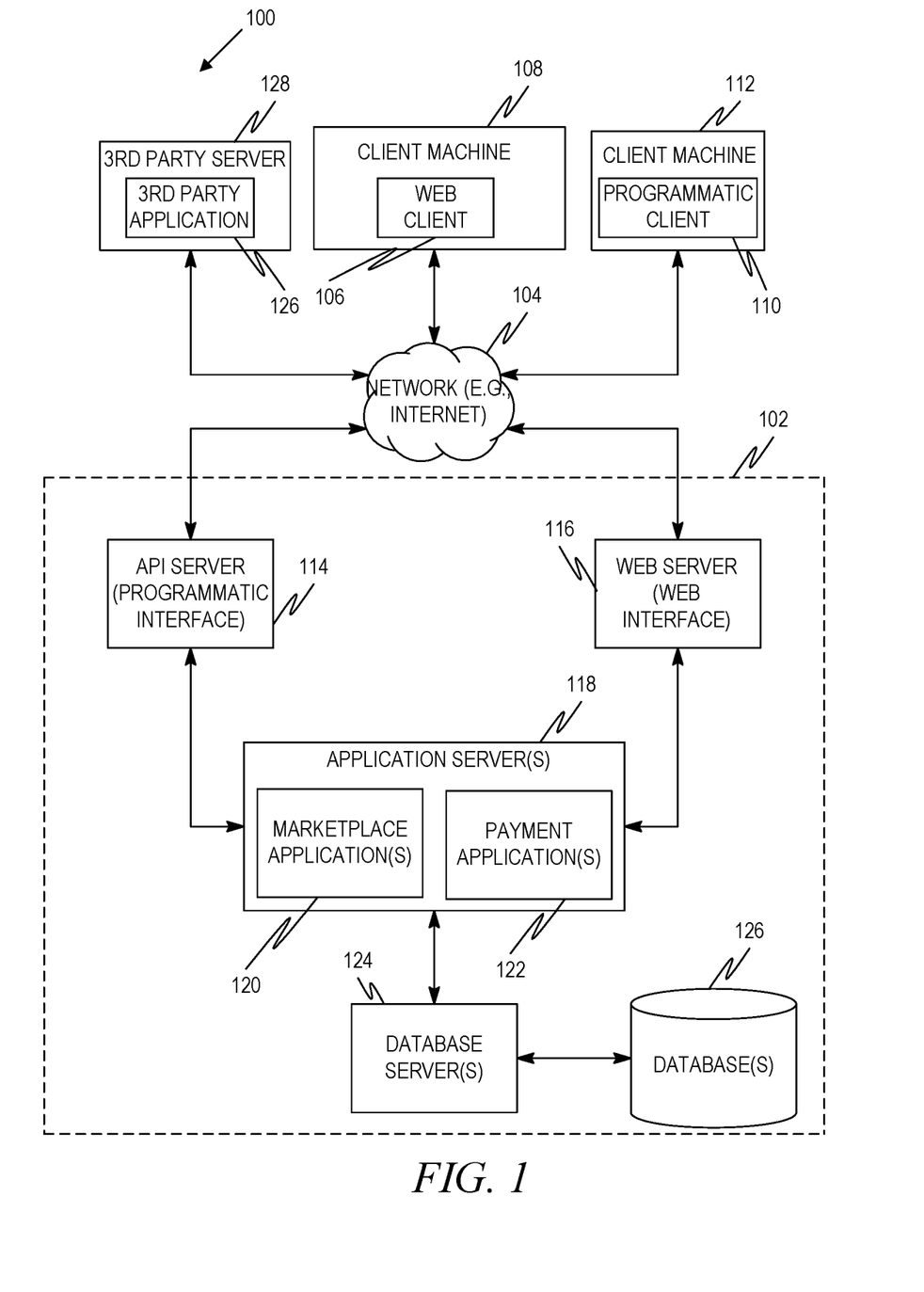
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 110 executing on respective client machines 108 and 112.

An application programming interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 110 accesses the various services and functions provided by the marketplace and payment applications 120 and 122 via the programmatic interface provided by the API server 114. The programmatic client 110 may, for example, be a seller application (e.g., the TurboLister application developed by eBay Inc., of San Jose, Calif.) to enable sellers to author and manage listings on the networked system 102 in an offline manner, and to perform batch-mode communications between the programmatic client 110 and the networked system 102.

FIG. 1 also illustrates a third-party application 126, executing on a third-party server machine 128, as having programmatic access to the networked system 102 via the programmatic interface provided by the API server 114. For example, the third-party application 126 may, utilizing information retrieved from the networked system 102, support one or more features or functions on a website hosted by a third party. The third-party website may, for example, provide one or more promotional, marketplace, or payment functions that are supported by the relevant applications of the networked system 102.

Figure 2:
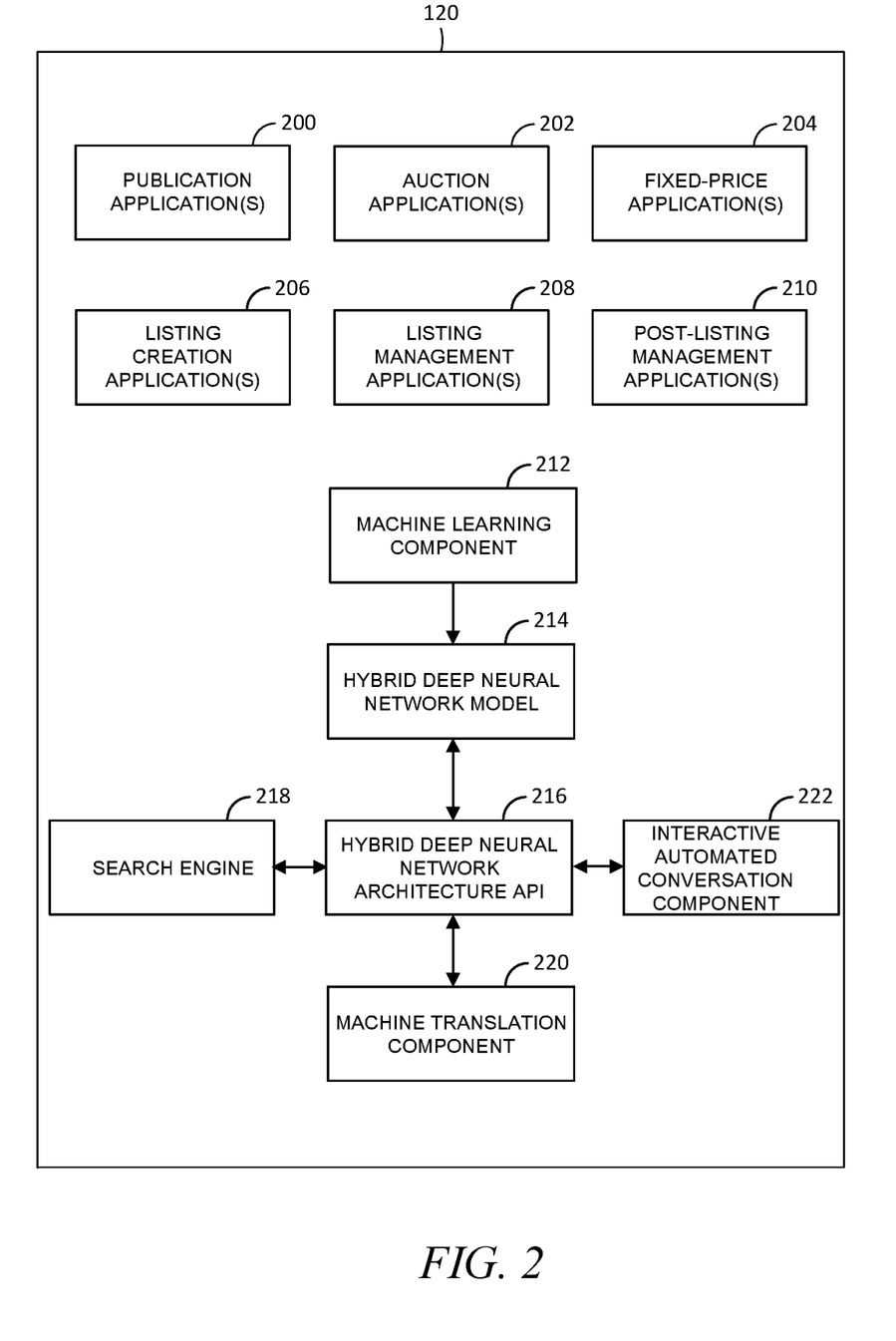
FIG. 2 is a block diagram illustrating marketplace applications that, in one example embodiment, are provided as part of a networked system of FIG. 1.

FIG. 2 is a block diagram illustrating marketplace applications 120 that, in one example embodiment, are provided as part of the networked system 102. The marketplace applications 120 may be hosted on dedicated or shared server machines (not shown) that are communicatively coupled to enable communications between or among server machines. The marketplace applications 120 themselves are communicatively coupled (e.g., via appropriate interfaces) to each other and to various data sources, so as to allow information to be passed between or among the marketplace applications 120 or so as to allow the marketplace applications 120 to share and access common data. The marketplace applications 120 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed price that is typically higher than the starting price of the auction.

Listing creation applications 206 allow sellers to conveniently author listings pertaining to goods or services that they wish to transact via the networked system 102, and listing management applications 208 allow sellers to manage such listings. Specifically, where a particular seller has authored and/or published a large number of listings, the management of such listings may present a challenge. The listing management applications 208 provide a number of features (e.g., auto-relisting, inventory level monitors, etc.) to assist the seller in managing such listings. One or more post-listing management applications 210 also assist sellers with a number of activities that typically occur post-listing.

A machine-learning component 212 provides for machine learning of one or more models that may be used, for example, by some of the marketplace applications 120.

Figure 3:
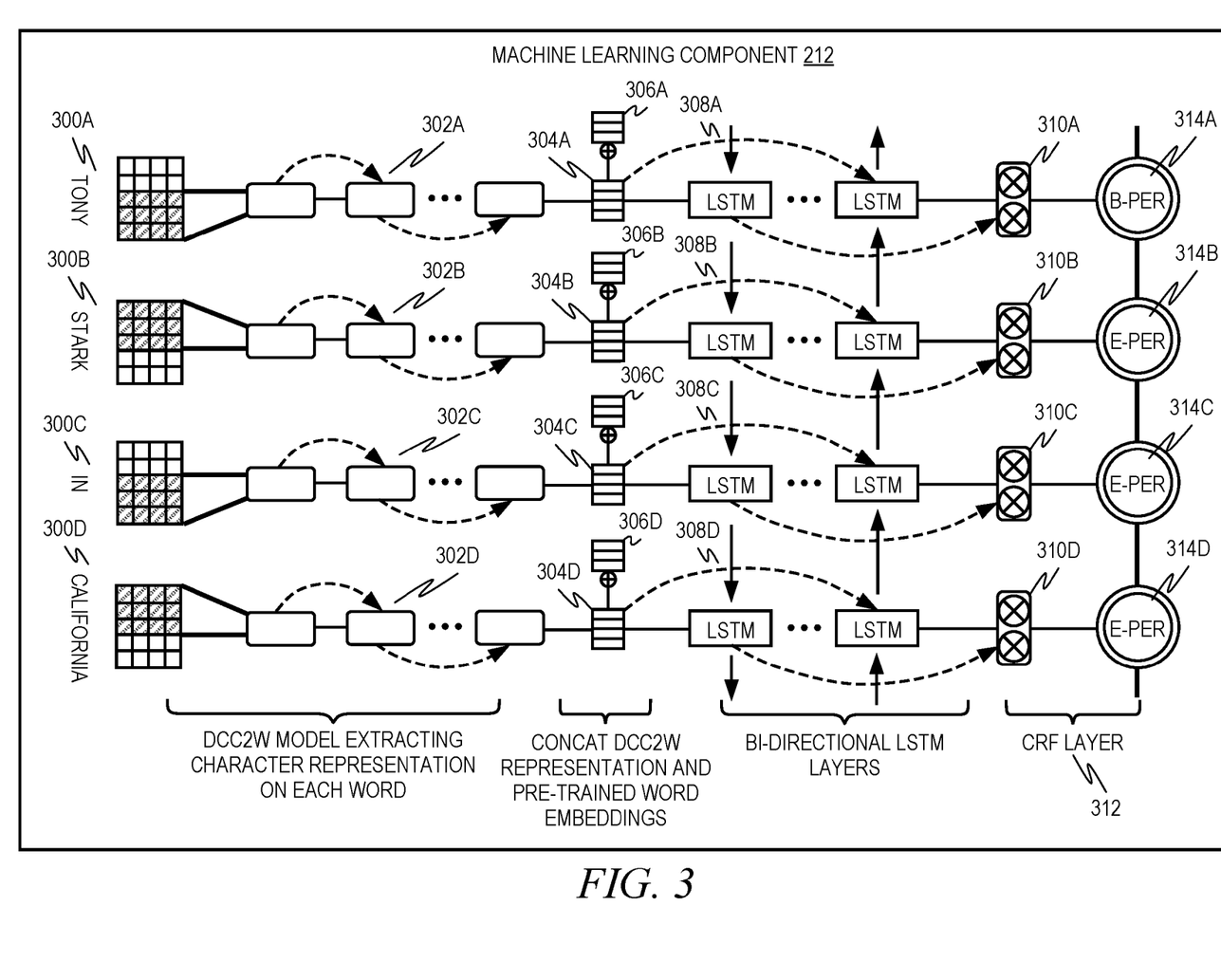
FIG. 3 is a block diagram illustrating a machine-learning component, such as a machine-learning component of FIG. 2, in more detail.

FIG. 3 is a block diagram illustrating a machine-learning component, such as the machine-learning component 212 of FIG. 2, in more detail. Each of one or more words 300A-300D is passed through a DCC2 W model (depicted here as 302A-302D, although in example embodiments these are not separate models) to generate DCC2 W representations 304A-304D. The DCC2 W representations 304A-304D are concatenated with pre-trained word embeddings 306A-306D, which are then fed into bidirectional LSTM layers 308A-308D to learn context information 310A-310D for each word 300A-300D in a sentence. Then, a sequential CRF layer 312 is applied to decode the best labels 314A-314D for each word 300A-300D.

Turning to the DCC2 W model 302A-302D, it would be beneficial to compose representations of characters into representations of words. However, the relationships between word forms and their meanings are difficult to ascertain. One mechanism to do this would be to use a shallow architecture for a character-to-word model, which includes one convolutional layer followed by a max pooling operation. This, however, has performance limitations. As such, in an example embodiment, a deep architecture is used.

The input of the DCC2 W model is a single word type, w, which is represented with a d-dimensional vector. The finite set of characters $V^{char}$ is defined. This vocabulary contains all the variations of raw text, that is, upper and lowercase letters, numbers, and punctuation. Unlike in character-based approaches for sentence classification, this information is helpful to capture morphological regularities for word classification.

The input word w is decomposed into a sequence of characters $\{c_1, \ldots, c_m\}$, where m is the length of w. Character embeddings are encoded by column vectors in the embedding matrix $W^{char} \in R^{d^{char} \times |V^{char}|}$, where $d^{char}$ is the number of parameters for each character in $V^{char}$. Given a character $c_i$, its embedding $r^{char}$ is obtained by the matrix-vector product $W_i^{char} v_i^{char}$, and $v_i^{char}$ is defined as one hot vector for $c_i$. Thus, the input for the convolutional layer is the sequence of character embeddings $\{r_1^{char}, \ldots, r_m^{char}\}$.

Figure 4:
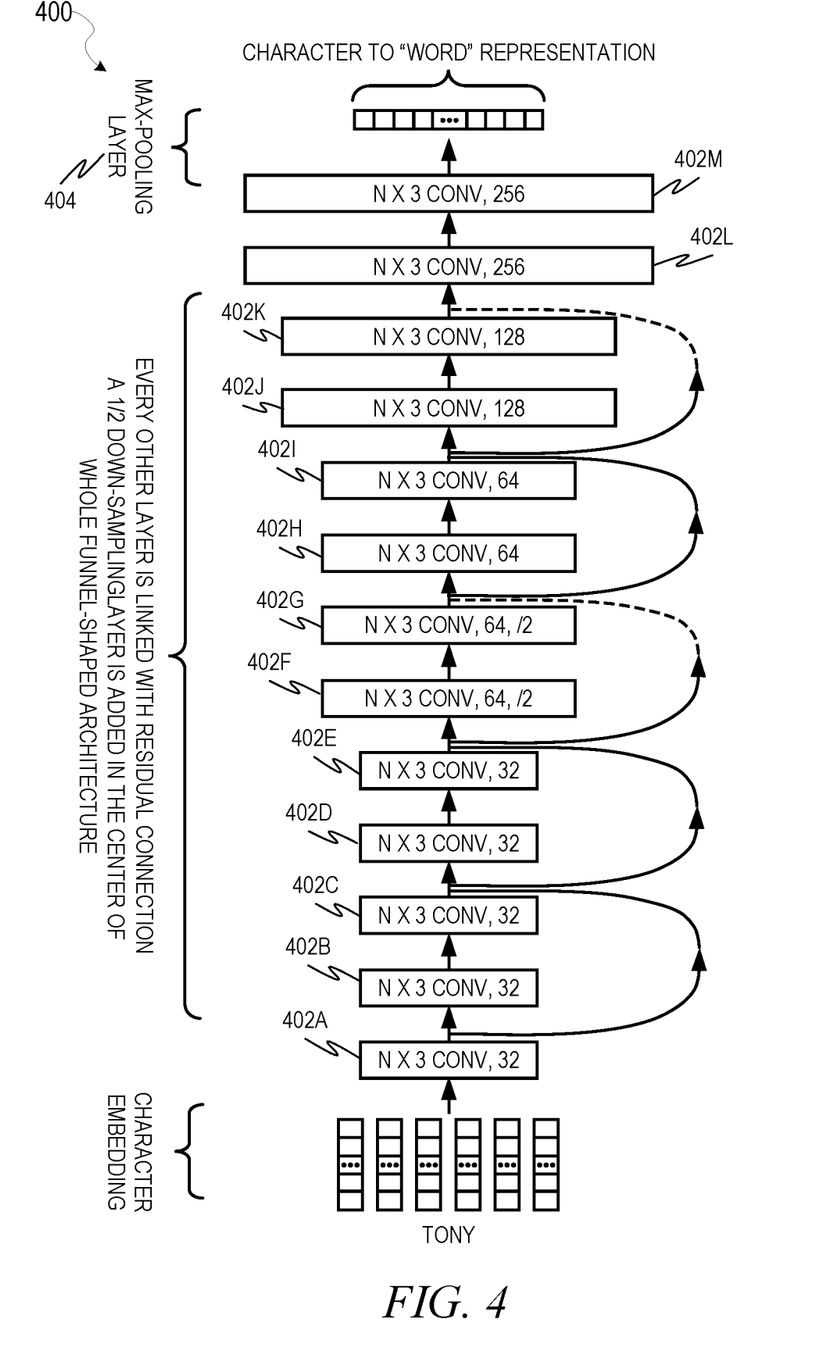
FIG. 4 is a block diagram illustrating an example of a DCC2 W with 13 convolutional layers.

In an example embodiment, four kinds of 1-D convolutions (32, 64, 128, 256) are used to build a funnel-shaped deep character-to-word architecture. Smaller feature maps (32, 64) may be used because the input of a word's character embedding is typically much smaller than a sentence. Different depths with different convolutional layers may be used. FIG. 4 is a block diagram illustrating an example of a DCC2 W 400 with 13 convolutional layers 402A-402M. The vectors for each of one or more characters 404 (character embeddings) are fed into the different layers of convolutions and down-sampling with residual connections to hierarchically extract features, finally using max-pooling 406 to obtain a vector representation 408 for the word (namely, a character-to-word representation).

In an example embodiment, a small kernel size (e.g., 3) may be used, although other kernel sizes (e.g., 5, 7) may be used. Each convolutional layer 402A-402M is followed by a batch normalization and a rectifier linear unit (ReLU) activation, with every other layer being linked with a residual connection, and a halving down-sampling layer (max pooling) 404 is added at the center of the whole DCC2 W 400. The DCC2 W 400 considers feature extraction and classification as one joint learning task, effectively removing the dependency on hand-crafted features. By using many different layers of convolutions and pooling, the model sequentially extracts a hierarchical representation of the words.

Referring back to FIG. 3, the bidirectional LSTM layers 308A-308D may deal with sequential data. While in theory recurrent neural networks (RNNs) are capable of capturing long-distance dependencies, in practice they often fail to do so due to gradient vanishing/exploding problems. LSTMs have been designed to overcome this issue by incorporating a memory cell. In an example embodiment, given the input vectors $(x_1, x_2, x_n)$, LSTMs return the sequence $(h_1, h_2, \ldots, h_n)$ that represents the sequential information at every step in the input. In an example embodiment, the following implementation is used:

$i_t = \sigma(W_{xi}x_t + W_{hi}h_{t-1} + W_{ci}c_{t-1} + b_i)$ $f_t = \sigma(W_{xf}x_t + W_{hf}h_{t-1} + W_{cf}c_{t-1} + b_f)$ $\tilde{c}_t = \tan h(W_{xc}x_t + W_{hc}h_{t-1} + b_c)$ $c_t = f_t \odot c_{t-1} + i_t \odot \tilde{c}_t$ $o_t = \sigma(W_{xo}x_t + W_{ho}h_{t-1} + W_{co}c_t + b_o)$ $h_t = o_t \odot \tan h(c_t)$ where $\sigma$ is the element-wise sigmoid function and $\odot$ is the element-wise product. $x_t$ is the input vector at time t and $i_t$, $f_t$, $o_t$, $c_t$ are the input gate, forget gate, output gate, and cell vectors, all of which are the same size as the hidden vector $h_t$. $W_{xi}$, $W_{xf}$, $W_{xo}$, $W_{xc}$ h denote the weight matrices of different gates for input $x_t$; $W_{hi}$, $W_{hf}$, $W_{ho}$, $W_{hc}$ are the weight matrices for hidden state $h_t$, and $b_i$, $b_f$, $b_o$, $b_c$ denote the bias vectors.

For a given sentence $(x1, x2, \ldots, x_n)$ containing n words, each represented as a d-dimensional vector, an LSTM computes a representation $\overrightarrow{h}_t$ of the left context of the sentence. However, the LSTM's hidden state hi takes information only from the past (left), knowing nothing about the future. Thus, generating a representation of the right context $\overleftarrow{h}_t$ as well should add useful information. This can be achieved using a second LSTM that reads the same sequence in reverse. The former may be referred to as the forward LSTM and the latter as the backward LSTM. The two hidden states are concatenated to form the bi-directional LSTM (BLSTM) output $[\overrightarrow{h}_t, \overleftarrow{h}_t]$. Thus each sequence is presented forward and backward on two separate hidden states to capture past and future information.

Turning now to the sequential CRF layer 312, for sequence labeling tasks it is beneficial to consider the correlations between labels in neighborhoods and jointly decode the best chain of labels for a given input sentence (e.g., I-PER should not follow B-LOC in NER). Therefore, the function $f$ can be written as:

$$f(h, y) = \sum_{t=1}^{T} w_{y_t} h_t^w + \sum_{t=1}^{T} A_{y_{t-1}, y_t}$$

with A being a matrix of transition scores such that $A_{ij}$ represents the score of a transition from the tag i to tag j, and $y_0$ are the start tags of a sentence. Let y(h) denote the set of possible label sequences for h. A probabilistic model for a sequence CRF defines a family of conditional probabilities p (y|h) over all possible label sequences y given h with the following form:

$$p(y|h) = \frac{e^{f(h,y)}}{\sum_{y' \in y(h)} e^{f(h,y')}}$$

For network training, maximum conditional likelihood estimation can be used to maximize the log probability of the correct tag sequence:

$$\log(p(y|h)) = f(h, y) - \log\left(\sum_{y' \in y(h)} e^{f(h,y')}\right)$$

While decoding, the label sequence that obtains the highest score given by $$y^* = \arg \max_{y' \in y(h)} f(h, y')$$

can be predicted. For a sequence CRF model (where interactions between two successive labels are considered), training and decoding can be solved efficiently by adopting, for example, the Viterbi algorithm. The Viterbi algorithm is a dynamic programming algorithm for finding the most likely sequence of hidden states, called the Viterbi path, that results in a sequence of observed events, especially in the context of Markov information sources and hidden Markov models.

Turning now to training, since the training corpus for a sequence tagging task is relatively small, it is difficult to train randomly initialized word embeddings to accurately capture the word semantics. Therefore, in an example embodiment, word embeddings pretrained on large-scale unlabeled corpora are leveraged. In this embodiment, only pre-trained word embeddings are used for initialization.

In an example embodiment, a lookup table with values drawn from a uniform distribution with range [−0.5, +0.5] is initialized. Each character's embedding dimension is 32 and the character set includes all unique characters, such as uppercase and lowercase letters, numbers, punctuation, and the special tokens PADDING and UNKNOWN. In this example embodiment, no data pre-processing or capitalization features (e.g., allCaps, upperInitial, lowercase, mixedCaps, noInfo) are used. Different depths can be set for different languages, such as English, French, German, and Spanish.

As to the tagging scheme, in NER-related tasks, sentences are usually represented in the Beginning, Inside, Outside (BIO) format, where every token is labeled as B-label if the token is the beginning of a named entity, I-label if it is inside a named entity, but not the first token within the named entity, or O otherwise. In an example embodiment, a variation on this may be used, called BIOES tagging, which involves two more pieces of information about singleton entities (S) and also explicitly marks the end of named entities (E). The BIO scheme is only capable of determining that the subsequent word cannot be the interior of another label. Using the BIOES scheme, tagging a word as I-label with high confidence narrows down the choices for the subsequent word to I-label or E-label.

Training deep neural networks is complicated because the distribution of each layer's input changes during training. In an example embodiment, normalization is performed for each training mini-batch, helping to alleviate this problem. It has the additional benefit of making the deep network less sensitive to parameter initialization.

In an example embodiment, several residual connections may be employed between layers for the DCC2 W model. Formally, a residual unit can be defined as $y=F(x, \{W_i\})+x$, where x and y are the input and output vectors of the layers considered, $\{W_i\}$ are the weights for the i-th layers, and F is the residual mapping function. The operation F+x performs a shortcut connection and element-wise addition. This architecture allows for the construction of much deeper networks.

In order to reduce overfitting, a dropout method may be applied to regularize the model. Dropout layers are applied on both the input and output vectors of the bidirectional LSTMs, as well as to the input of the DCC2 W model and CRF layer. The dropout rate may be initially set to a fixed point (e.g., 0.5) and fine-tuned on different language datasets.

Referring back to FIG. 2, various use cases exist for a hybrid deep neural network architecture 214 trained by the machine-learning component 212 using the above-described techniques. Specifically, in some example embodiments, the hybrid deep neural network architecture 214 may be exposed to various services and components of the system by virtue of a hybrid deep neural network architecture application programming interface (API) 216, which can receive requests for estimates of probabilities of various potential named entities for an input set of words, such as a sentence. This hybrid deep neural network architecture API 216 may be system- and component-agnostic, in that any system or component may make the request and be provided with the output, as long as the format of the request is correct.

Figure 5:
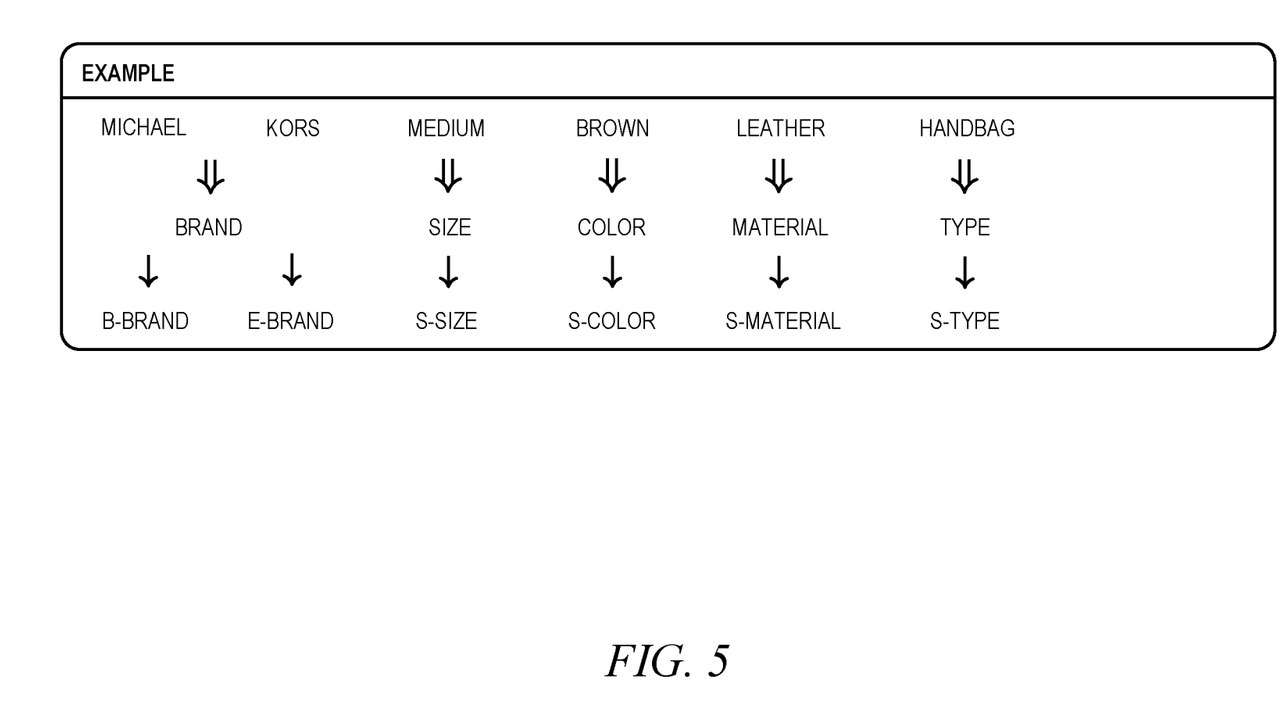
FIG. 5 is a diagram illustrating an example of a search query and corresponding named entity identification.

In one example embodiment, a search engine 218 may call the hybrid deep neural network architecture API 216 using a word, phrase, or sentence input by a user into a user interface designed to search a document corpus, such as web pages or publications. The results from the hybrid deep neural network architecture 214 may then be used by the search engine 218 in various aspects of search fulfillment. In one example embodiment, the results may be used to augment search queries with additional search terms that are related to named entities identified by the hybrid deep neural network architecture 214. FIG. 5 is a diagram illustrating an example of a search query and corresponding named entity identification. Specifically, the search query may be "Michael Kors Medium Brown Leather Handbag." The hybrid deep neural network architecture 214 may predict that the words "Michael" and "Kors" actually represent a single named entity, whereas the other terms are singletons. This helps the search engine 218 identify that "Michael Kors" is a brand, which then can be used to augment the search query with other terms related to this brand, such as shoes, wallets, and watches (other items sold by Michael Kors). In some example embodiments, the search engine 218 may use the results from the hybrid deep neural network architecture 214 to suggest search terms as the user is typing in search terms. In another example embodiment, the search engine 218 may utilize the results from the hybrid deep neural network architecture 214 to aid in ranking search results.

In another example embodiment, a machine translation component 220 may use the results from the hybrid deep neural network architecture 214 to better translate terms from one language to another. There may be certain terms that can be difficult to translate without knowing the underlying named entity (or lack thereof). For example, the term "Apple" could refer to the fruit, which likely has a different translated form in every different language, or could refer to the company, which likely shouldn't be translated into different languages. Due to the language-independent nature of the above-described approach, entities are able to be recognized regardless of their language.

In another example embodiment, an interactive automated conversation component 222 may use the results from the hybrid deep neural network architecture 214 to aid in interpretation of natural language input. The interactive automated conversation component 222 may be a computer program which conducts a conversation via auditory or textual methods, also known as a "chatbot." In some example embodiments, the interactive automated conversation component 222 may be utilized as a personal shopping assistant that recommends products for sale listed on an online publication system to a user who conducts "conversations" with the interactive automated conversation component 222, based on the input provided by the user. Since the input likely will be in a natural language (either spoken or written), the interactive automated conversation component 222 may use the results from the hybrid deep neural network architecture 214 to help decipher the meanings of words and phrases.

In another example embodiment, the listing creation application(s) 206 may use the results from the hybrid deep neural network architecture 214 to aid in automatically completing an item or product listing in the networked system 102. Specifically, a user may list an item for sale and may, as part of that process, complete an item listing by filling in certain fields, such as title, category, description, specifications, price, etc. In order to make this process easier for the user, the listing creation application(s) 206 may automatically populate certain fields based on user input. For example, if the user types the phrase "iphone 6s 98 GB Gold," the listing creation application(s) 206 may identify the particular product corresponding to this phrase and prepopulate certain other fields for the user, such as dimensions, general item description, and even perhaps images.

The listing creation application(s) 206 may use the results from the hybrid deep neural network architecture 214 to aid in this process.

Figure 6:
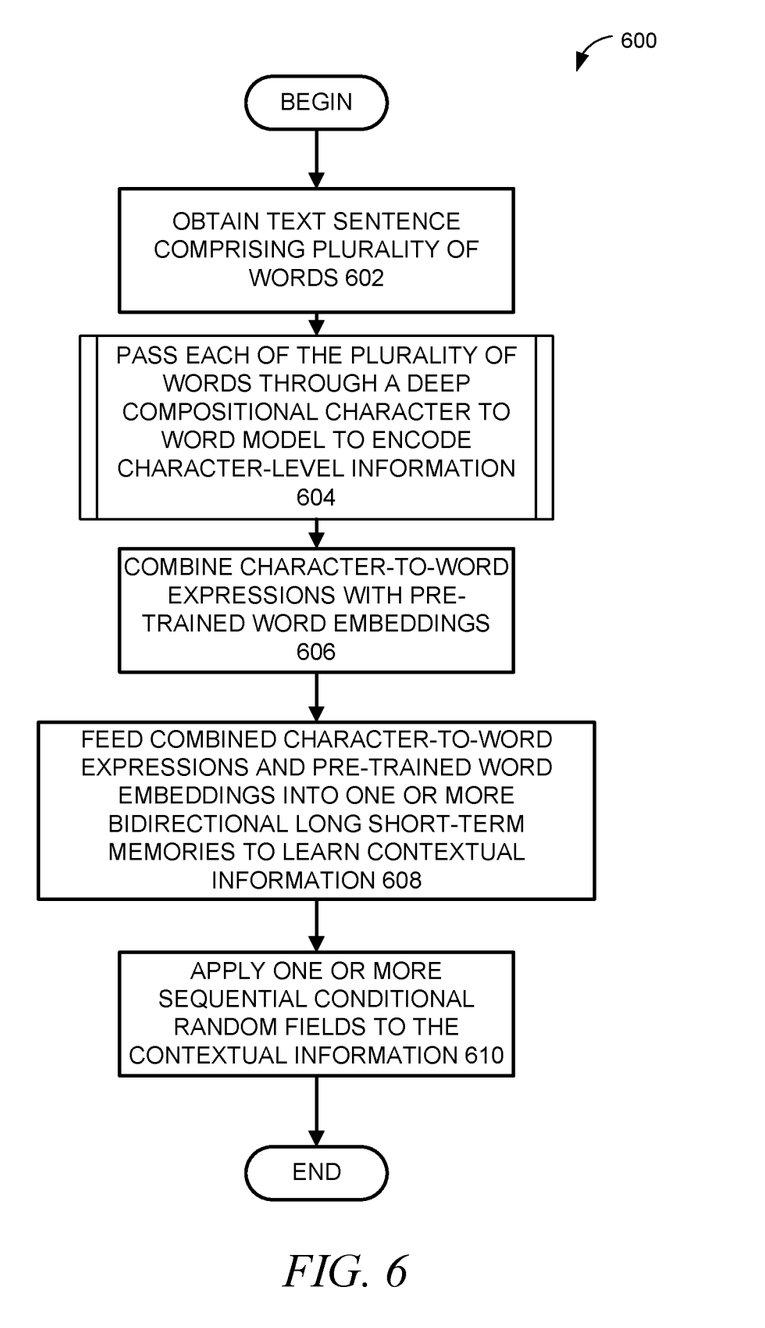
FIG. 6 is a flow diagram illustrating a method of interpreting words in a sentence of text in a computer system, in accordance with an example embodiment.

FIG. 6 is a flow diagram illustrating a method 600 of interpreting words in a sentence of text in a computer system, in accordance with an example embodiment. At operation 602, a text sentence comprising a plurality of words is obtained. At operation 604, each of the plurality of words is passed through a deep compositional character-to-word model to encode character-level information of each of the plurality of words into a character-to-word expression. In some example embodiments, there may be a single deep compositional character-to-word model, but in some example embodiments there may be a separate model for each word. In some example embodiments, these multiple models, however, may be identical.

At operation 606, the character-to-word expressions are combined with pre-trained word embeddings. This combining may be, for example, a concatenation operation. At operation 608, the combined character-to-word expressions and pre-trained word embeddings are fed into one or more bidirectional long short-term memories to learn contextual information for each of the plurality of words. At operation 610, one or more sequential conditional random fields are applied to the contextual information for each of the plurality of words.

Figure 7:
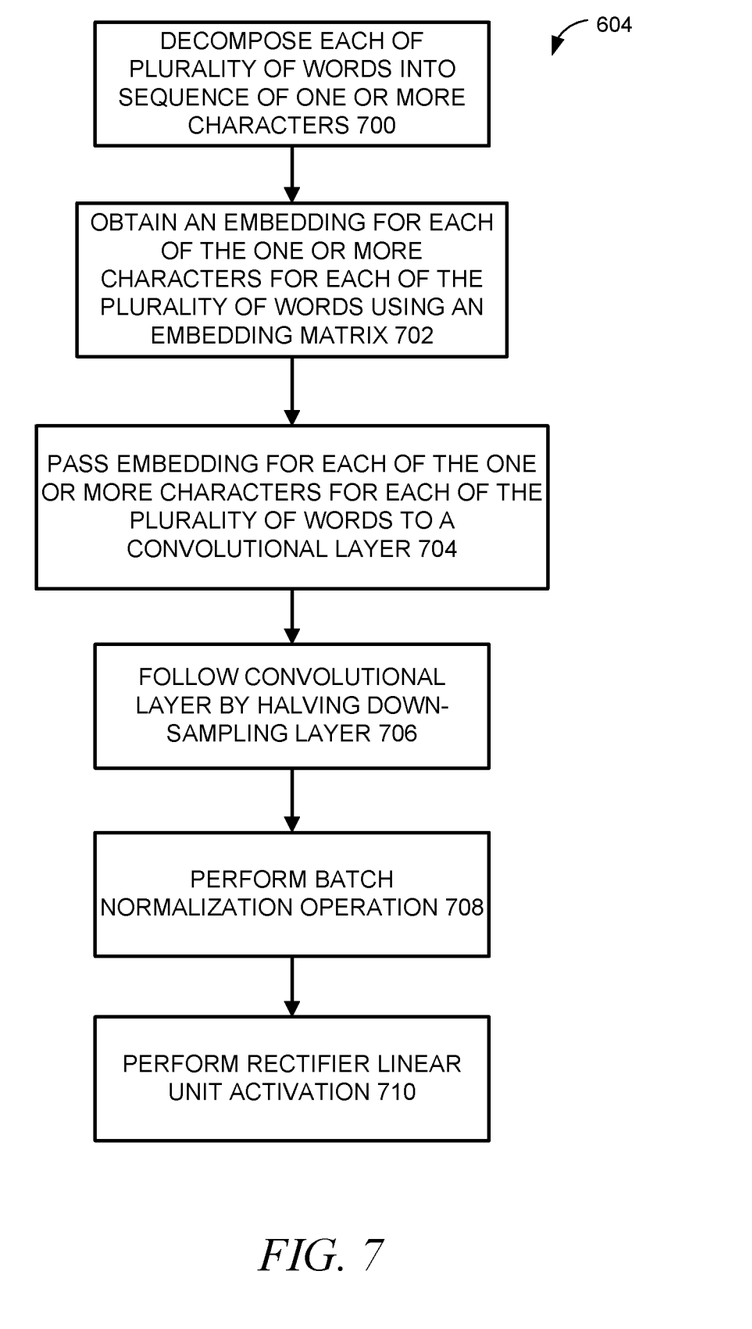
FIG. 7 is a flow diagram illustrating an operation of FIG. 6 in more detail.

FIG. 7 is a flow diagram illustrating operation 604 of FIG. 6 in more detail. At operation 700, each of the plurality of words is decomposed into a sequence of one or more characters. At operation 702, an embedding is obtained for each of the one or more characters for each of the plurality of words using an embedding matrix. At operation 704, the embedding for each of the one or more characters for each of the plurality of words is passed to a convolutional layer. In an example embodiment, the convolutional layer includes four types of one-dimensional convolutions. At operation 706, the convolutional layer is followed by a halving downsampling layer. At operation 708, a batch normalization operation is performed. At operation 710, rectifier linear unit activation is performed.

Figure 8:
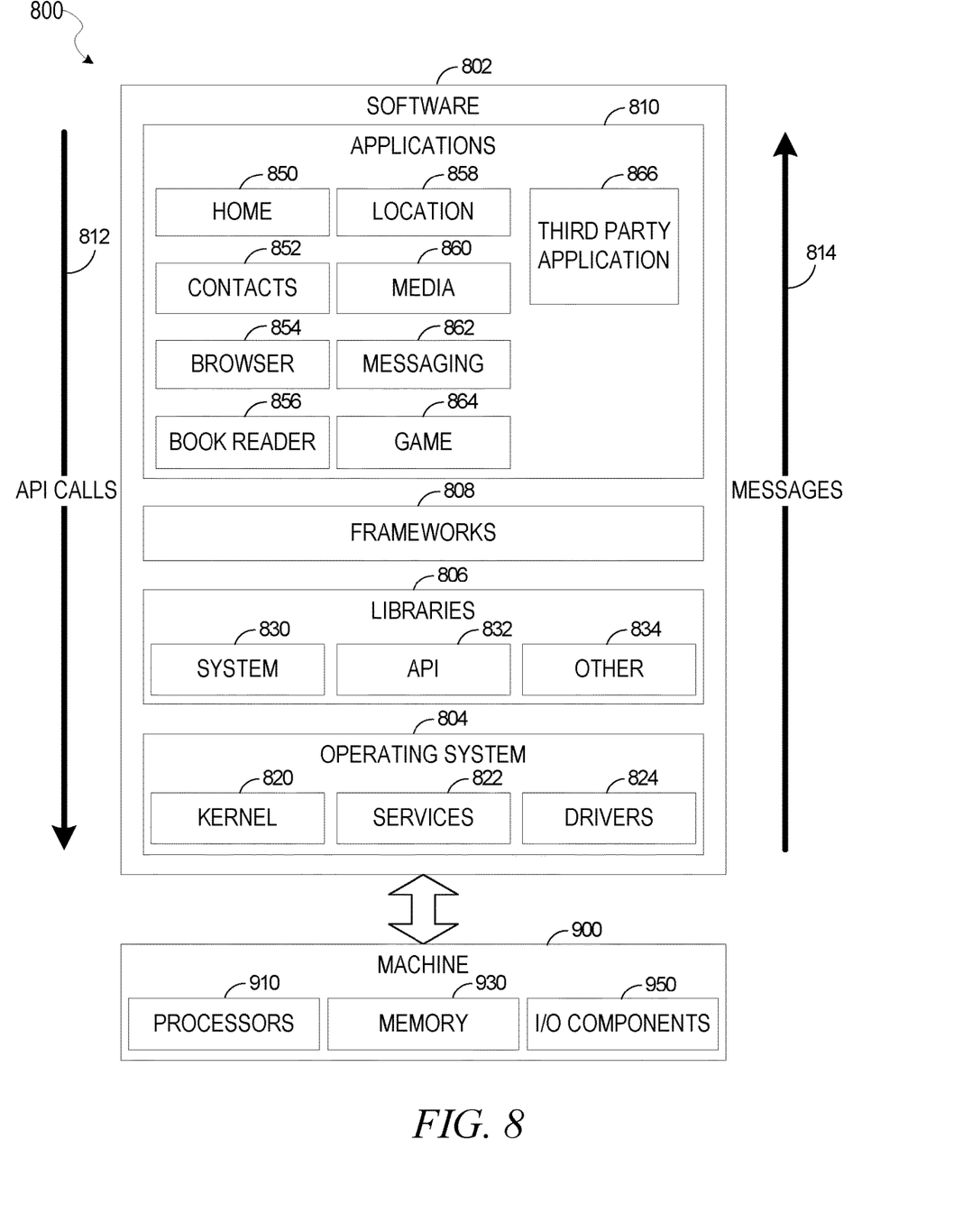
FIG. 8 is a block diagram illustrating an architecture of software, which can be installed on any one or more of the devices described above.

FIG. 8 is a block diagram 800 illustrating an architecture of software 802, which can be installed on any one or more of the devices described above. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processors 910, memory 930, and I/O components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system or platform.

In an example embodiment, the applications 810 include a home application 850, a contacts application 852, a browser application 854, a book reader application 856, a location application 858, a media application 860, a messaging application 862, a game application 864, and a broad assortment of other applications such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
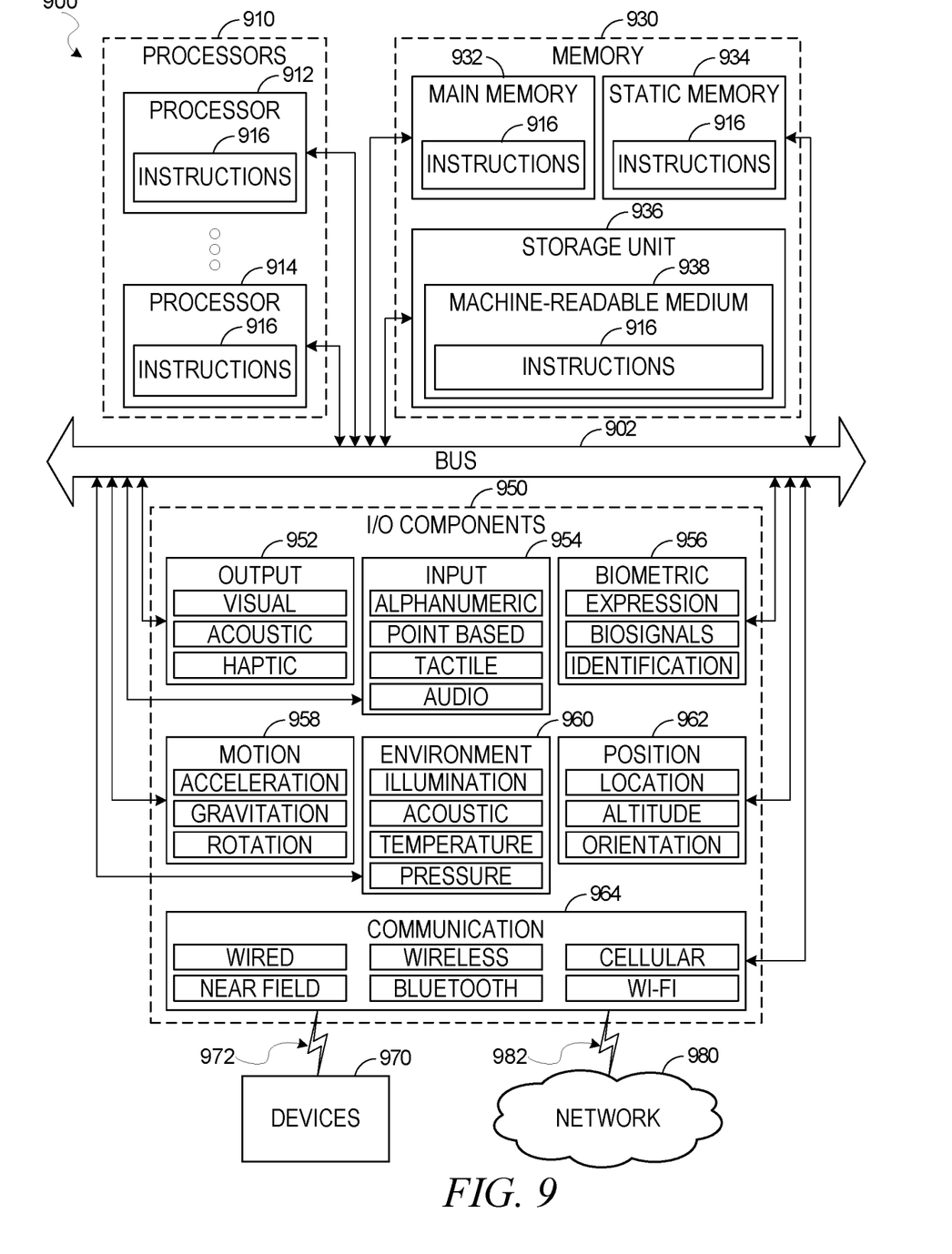
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 600 of FIG. 6. Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910 and/or the storage unit 936 may store one or more sets of instructions and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
one or more deep compositional character-to-word models to encode character-level information of each of a plurality of words, received in a search query, into respective character-to-word expressions, wherein each of the one or more deep compositional character-to-word models has a plurality of convolutional layers that, when passed a word, sequentially extracts a hierarchical representation of the plurality of words;

one or more bidirectional long short-term memories, that, when fed a combination of the character-to-word expressions and pre-trained word embeddings, learn contextual information for each of the plurality of words;

one or more sequential conditional random fields that, when applied to the contextual information for each of the plurality of words, classify at least two words of the plurality of words as a single entity, the single entity corresponding to a brand name, wherein the one or more sequential conditional random fields assign a label to each of the plurality of words based at least in part on a determination of a best chain of labels for the plurality of words; and network architecture to coordinate with a search engine to:
augment the search query with at least one additional search term based at least in part on the at least two words of the plurality of words being classified as the single entity corresponding to the brand name, the at least one additional search term corresponding to an item associated with the brand name; and
return one or more search results for the augmented search query based at least in part on the one or more sequential conditional random fields for the contextual information for each of the plurality of words.

2. The system of claim 1, wherein the encoded character-level information is concatenated with one or more pre-trained word embeddings.

3. The system of claim 1, wherein each of the one or more deep compositional character-to-word models performs operations comprising:
decomposing each of the plurality of words into a sequence of one or more characters;
obtaining an embedding for each of the one or more characters for each of the plurality of words using an embedding matrix; and
passing the embedding for each of the one or more characters for each of the plurality of words to a convolutional layer.

4. The system of claim 3, wherein the convolutional layer includes four types of one-dimensional convolutions.

5. The system of claim 3, wherein the convolutional layer is followed by a batch normalization and rectifier linear unit activation.

6. The system of claim 5, wherein the convolutional layer is further followed by a halving down-sampling layer.

7. A method comprising:
receiving a search query comprising a text sentence, wherein the text sentence comprises a plurality of words;
passing each of the plurality of words through one or more deep compositional character-to-word models to encode character-level information of each of the plurality of words into respective character-to-word expressions, wherein each of the one or more deep compositional character-to-word models has a plurality of convolutional layers that, when passed a word, sequentially extracts a hierarchical representation of the plurality of words;
combining the character-to-word expressions with pre-trained word embeddings;
feeding the combined character-to-word expressions and the pre-trained word embeddings into one or more bidirectional long short-term memories to learn contextual information for each of the plurality of words;
applying sequential conditional random fields to the contextual information for each of the plurality of words to classify at least two words of the plurality of words as a single entity, the single entity corresponding to a brand name, wherein the applying assigns a label to each of the plurality of words based at least in part on a determination of a best chain of labels for the text sentence;
augmenting the search query with at least one additional search term based at least in part on the at least two words of the plurality of words being classified as the single entity corresponding to the brand name, the at least one additional search term corresponding to an item associated with the brand name; and
returning one or more search results for the augmented search query based at least in part on the applied sequential conditional random fields for the contextual information for each of the plurality of words.

8. The method of claim 7, wherein the combining includes concatenation.

9. The method of claim 7, wherein the passing includes:
decomposing each of the plurality of words into a sequence of one or more characters;
obtaining an embedding for each of the one or more characters for each of the plurality of words using an embedding matrix; and
passing the embedding for each of the one or more characters for each of the plurality of words to a convolutional layer.

10. The method of claim 9, wherein the convolutional layer includes four types of one-dimensional convolutions.

11. The method of claim 9, wherein the convolutional layer is followed by a batch normalization and rectifier linear unit activation.

12. The method of claim 11, wherein the convolutional layer is further followed by a halving down-sampling layer.

13. A non-transitory computer-readable storage medium comprising instructions that, when executed by at least one processor of a machine, cause the machine to perform operations comprising:
receiving a search query comprising a text sentence, wherein the text sentence comprises a plurality of words;
passing each of the plurality of words through one or more deep compositional character-to-word models to encode character-level information of each of the plurality of words into respective character-to-word expressions, wherein each of the one or more deep compositional character-to-word models has a plurality of convolutional layers that, when passed a word, sequentially extracts a hierarchical representation of the plurality of words;
combining the character-to-word expressions with pre-trained word embeddings;
feeding the combined character-to-word expressions and the pre-trained word embeddings into one or more bidirectional long short-term memories to learn contextual information for each of the plurality of words;
applying sequential conditional random fields to the contextual information for each of the plurality of words to classify at least two words of the plurality of words as a single entity, the single entity corresponding to a brand name, wherein the applying assigns a label to each of the plurality of words based at least in part on a determination of a best chain of labels for the text sentence;

augmenting the search query with at least one additional search term based at least in part on the at least two words of the plurality of words being classified as the single entity corresponding to the brand name, the at least one additional search term corresponding to an item associated with the brand name; and returning one or more search results for the augmented search query based at least in part on the applied sequential conditional random fields for the contextual information for each of the plurality of words.

14. The non-transitory computer-readable storage medium of claim 13, wherein the combining includes concatenation.

15. The non-transitory computer-readable storage medium of claim 13, wherein the passing includes:

decomposing each of the plurality of words into a sequence of one or more characters;

obtaining an embedding for each of the one or more characters for each of the plurality of words using an embedding matrix; and passing the embedding for each of the one or more characters for each of the plurality of words to a convolutional layer.

16. The non-transitory computer-readable storage medium of claim 15, wherein the convolutional layer includes four types of one-dimensional convolutions.

17. The non-transitory computer-readable storage medium of claim 16, wherein the convolutional layer is followed by a batch normalization and rectifier linear unit activation.

18. The non-transitory computer-readable storage medium of claim 16, wherein the convolutional layer is further followed by a halving down-sampling layer.

* * * * *